(12) United States Patent
Prociw et al.

(10) Patent No.: US 7,617,683 B2
(45) Date of Patent: Nov. 17, 2009

(54) FUEL NOZZLE AND MANIFOLD ASSEMBLY CONNECTION

(75) Inventors: Lev Alexander Prociw, Elmira (CA); Alekaandar Kojovic, Oakville (CA)

(73) Assignee: Pratt & Whitney Canada Corp., Longueuil (CA)

( * ) Notice: Subject to any disclaimer, the term of this patent is extended or adjusted under 35 U.S.C. 154(b) by 755 days.

(21) Appl. No.: 11/300,476

(22) Filed: Dec. 15, 2005

(65) Prior Publication Data
US 2007/0137209 A1 Jun. 21, 2007

(51) Int. Cl.
F02G 1/00 (2006.01)
F02G 3/00 (2006.01)
(52) U.S. Cl. .............................. 60/739; 60/734; 60/740
(58) Field of Classification Search .................. 60/739, 60/734, 776, 740, 742, 746, 747
See application file for complete search history.

(56) References Cited

U.S. PATENT DOCUMENTS

| | | | |
|---|---|---|---|
| 2,690,648 A | 10/1954 | Pearce et al. | |
| 2,970,438 A | 2/1961 | Howald | |
| 2,993,338 A | 7/1961 | Wilsted | |
| 3,147,594 A | 9/1964 | Hill et al. | |
| 3,335,567 A | 8/1967 | Hemsworth | |
| 3,472,025 A | 10/1969 | Sirnmons et al. | |
| 3,516,252 A | 8/1970 | Udell et al. | |
| 4,028,888 A | 6/1977 | Pilarczyk | |
| 4,467,610 A | 8/1984 | Pearson et al. | |
| 4,708,371 A | 11/1987 | Elsworth et al. | |
| 4,938,418 A * | 7/1990 | Halvorsen | 239/5 |
| 5,031,407 A | 7/1991 | Zaremba et al. | |
| 5,197,288 A | 3/1993 | Newland et al. | |
| 5,277,023 A * | 1/1994 | Bradley et al. | 60/39.094 |
| 5,598,696 A * | 2/1997 | Stotts | 60/779 |
| 5,771,696 A | 6/1998 | Hansel et al. | |
| 5,881,550 A * | 3/1999 | Toelle | 60/39.094 |
| 6,076,356 A * | 6/2000 | Pelletier | 60/740 |
| 6,141,968 A * | 11/2000 | Gates et al. | 60/740 |
| 6,256,995 B1 | 7/2001 | Sampath et al. | |
| 6,354,085 B1 * | 3/2002 | Howell et al. | 60/740 |
| 6,755,024 B1 * | 6/2004 | Mao et al. | 60/776 |
| 2005/0039457 A1 | 2/2005 | Moraes | |

* cited by examiner

Primary Examiner—William H Rodriguez
(74) Attorney, Agent, or Firm—Ogilvy Renault LLP

(57) ABSTRACT

A fuel supply assembly for a gas turbine engine including a manifold portion with a transfer conduit, a fuel nozzle with an entry conduit and disconnectable means for retaining the transfer and entry conduits in mating engagement with one another.

20 Claims, 3 Drawing Sheets

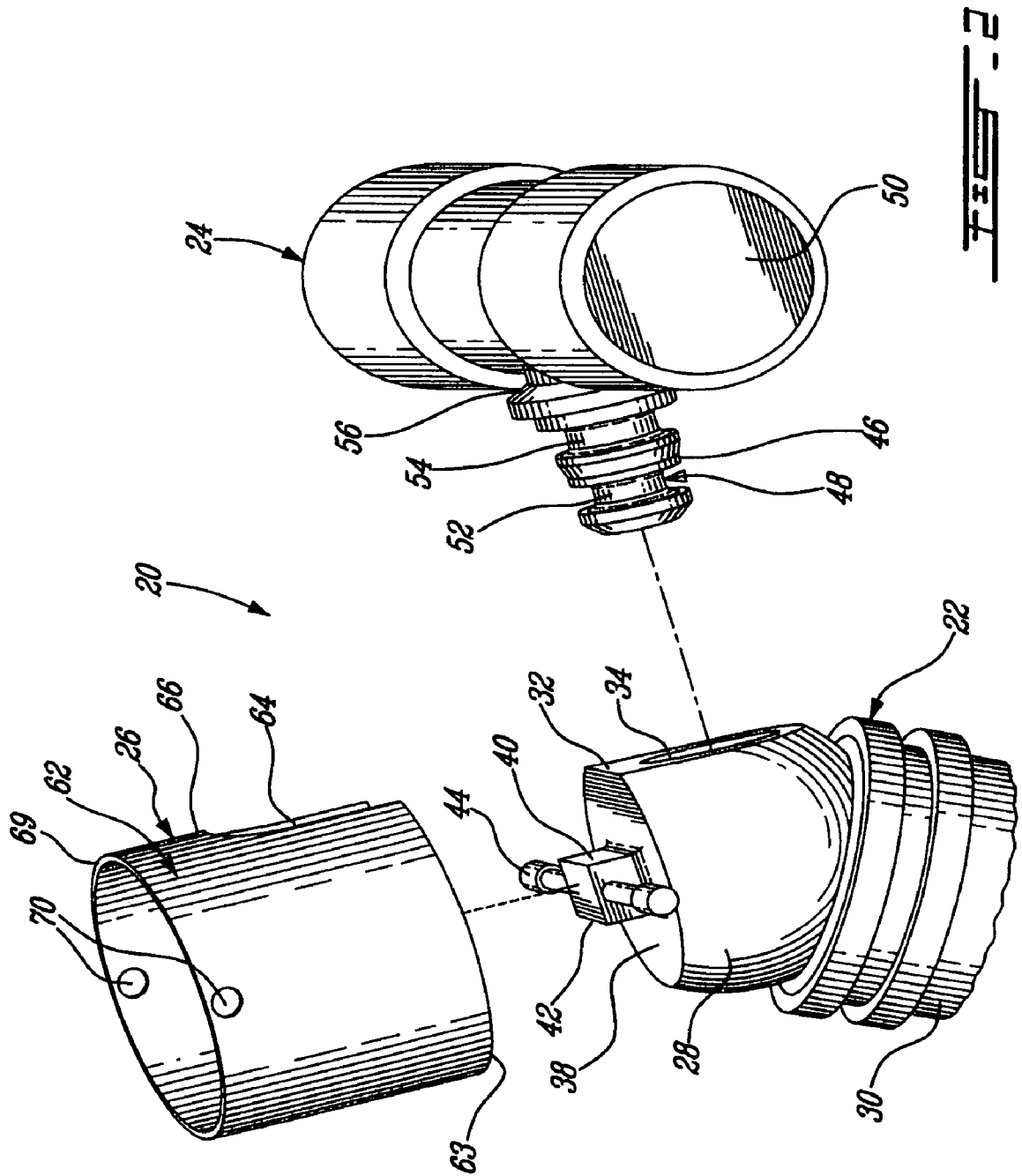

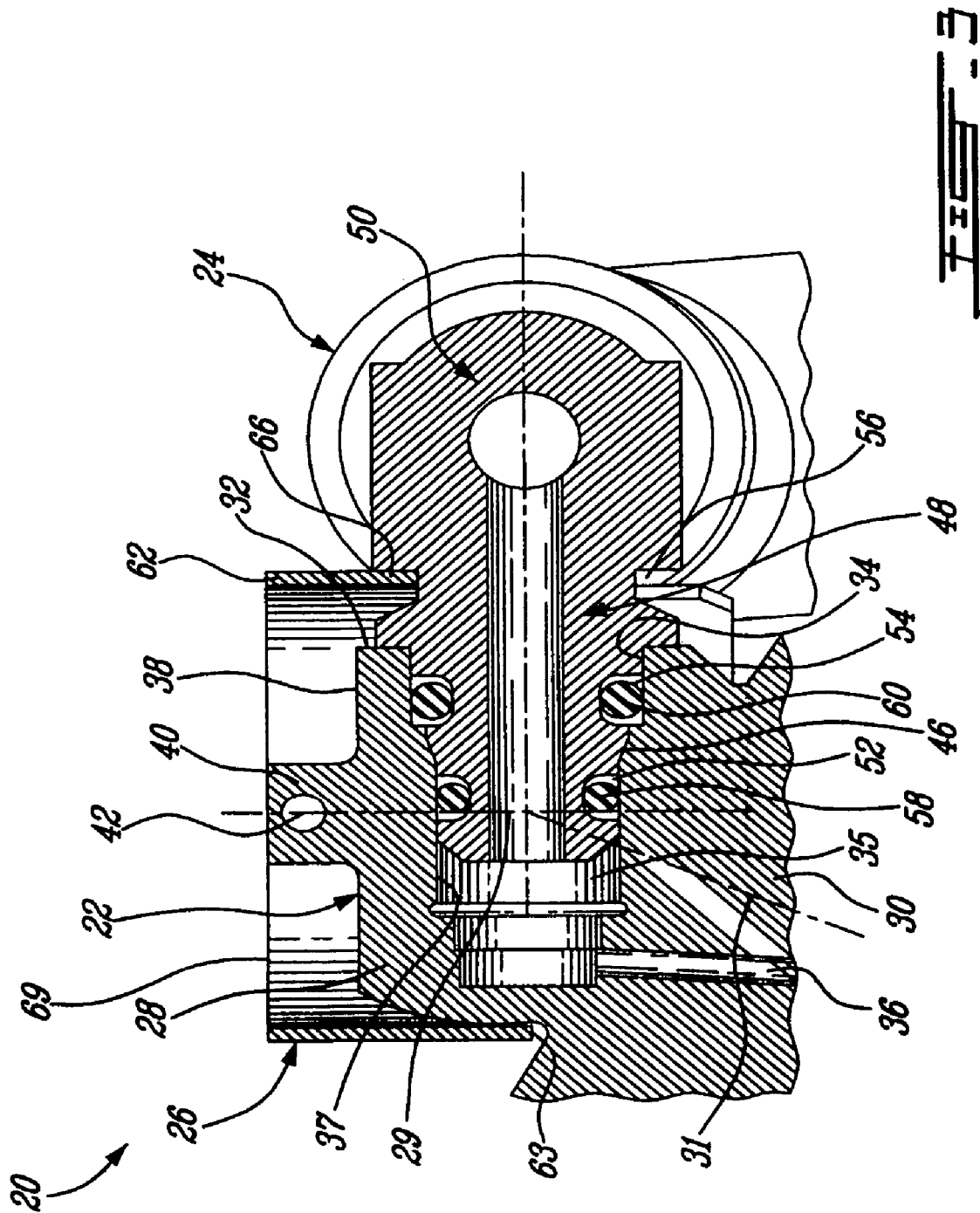

FUEL NOZZLE AND MANIFOLD ASSEMBLY CONNECTION

TECHNICAL FIELD

The invention relates generally to gas turbine engines and, more particularly, to an improved fuel supply assembly for such engines.

BACKGROUND OF THE ART

Usually, fuel supply assemblies for combustors of gas turbine engines include a fuel manifold extending around the combustor's outer casing to supply fuel to a plurality of fuel nozzles extending within the casing through the casing wall. Known manifold configurations include manifolds composed of a number of individual transfer tubes each connected to a special fitting in the fuel nozzle, allowing the manifold to expand and contract with engine temperature. However, this type of manifold usually changes volume when expanding and contracting and as such can create a fuel pumping effect which is detrimental to engine performances.

Manifolds are often connected to the fuel nozzles along a radial direction of the engine, and as such must usually be bent and twisted in order to perform the connection. The bending and twisting action can damage the sealing elements upon connection, which can lead to fuel leaks in use.

Moreover, prior art connections between the manifold and the fuel nozzles usually include one or more mechanical connectors requiring the use of tools for installation or removal thereof, which increases the time and complexity of assembly and maintenance.

Accordingly, there is a need for an improved fuel supply assembly.

SUMMARY OF THE INVENTION

It is therefore an object of this invention to provide an improved fuel supply assembly.

In one aspect, the present invention provides a fuel supply assembly for a gas turbine engine, the assembly comprising: a manifold portion including a main conduit and a transfer conduit extending therefrom in fluid communication therewith, a fuel nozzle including a nozzle head having an entry conduit defined therein in fluid communication with a fuel flow path of the fuel nozzle, the transfer conduit and the entry conduit being matingly engaged to provide fluid communication between the fuel flow path of the fuel nozzle and the main conduit of the manifold portion, and means for retaining the transfer conduit and the entry conduit in mated engagement, the means including a first portion slidingly engaged in a groove defined in an outer surface of a first one of the manifold portion and the fuel nozzle and a second portion rigidly connected to the first portion, the second portion being detachably connected to the second one of the manifold portion and the fuel nozzle and preventing disengagement of the first portion from the groove, the means being disconnectable from the second one of the manifold portion and the fuel nozzle to allow disengagement of the first portion from the groove such as to permit the transfer conduit and the entry conduit, and therefore the manifold portion and the fuel nozzle, to be disengaged from one another.

In another aspect, the present invention provides a fuel supply assembly for a gas turbine engine, the assembly comprising: a fuel manifold having a main conduit and a plurality of transfer conduits extending from the main conduit in fluid communication therewith, an outer wall surface of each of the transfer conduits including a depressed wall portion of reduced cross-section, a fuel nozzle for each of the transfer conduits, the fuel nozzle having a stem with a fuel flow path defined therein and a nozzle head connected to the stem, the nozzle head having an entry conduit defined therein in fluid communication with the fuel flow path, the entry conduit and a respective one of the transfer conduits being matingly engaged to provide fluid communication between the main conduit of the manifold and the fuel flow path, and a connecting member including at least one wall portion defining a wall end, the connecting member being detachably connected to the nozzle head of the fuel nozzle with the wall end engaged within the depressed wall portion of the respective one of the transfer conduits such as to prevent the entry conduit and the respective one of the transfer conduits to be slidingly disengaged from each other, the connecting member being disconnectable from the nozzle head and disengageable from the depressed wall portion to allow the entry conduit and the respective one of the transfer conduits, and therefore the fuel nozzle and the fuel manifold, to be disengaged from each other.

In another aspect, the present invention provides a method for connecting a fuel nozzle to a fuel manifold in a gas turbine engine, the method comprising the steps of: matingly engaging a conduit of the manifold and a conduit of the fuel nozzle to form a sealed connection, engaging a wall portion of a connecting member within a groove defined in an outer surface of a first one of the manifold and the fuel nozzle to prevent disengagement of the conduits of the fuel manifold and the fuel nozzle from each other, and fastening the connecting member to a second one of the manifold and the fuel nozzle to prevent disengagement of the wall portion from the groove.

Further details of these and other aspects of the present invention will be apparent from the detailed description and figures included below.

DESCRIPTION OF THE DRAWINGS

Reference is now made to the accompanying figures depicting aspects of the present invention, in which:

FIG. 2 is a perspective, exploded view of a connecting member, nozzle head and manifold portion according to the present invention; and FIG. 3 is a schematic cross-sectional side view of the assembled connecting member, nozzle head and manifold portion of FIG. 2.

DETAILED DESCRIPTION OF THE PREFERRED EMBODIMENTS

Figure 1:
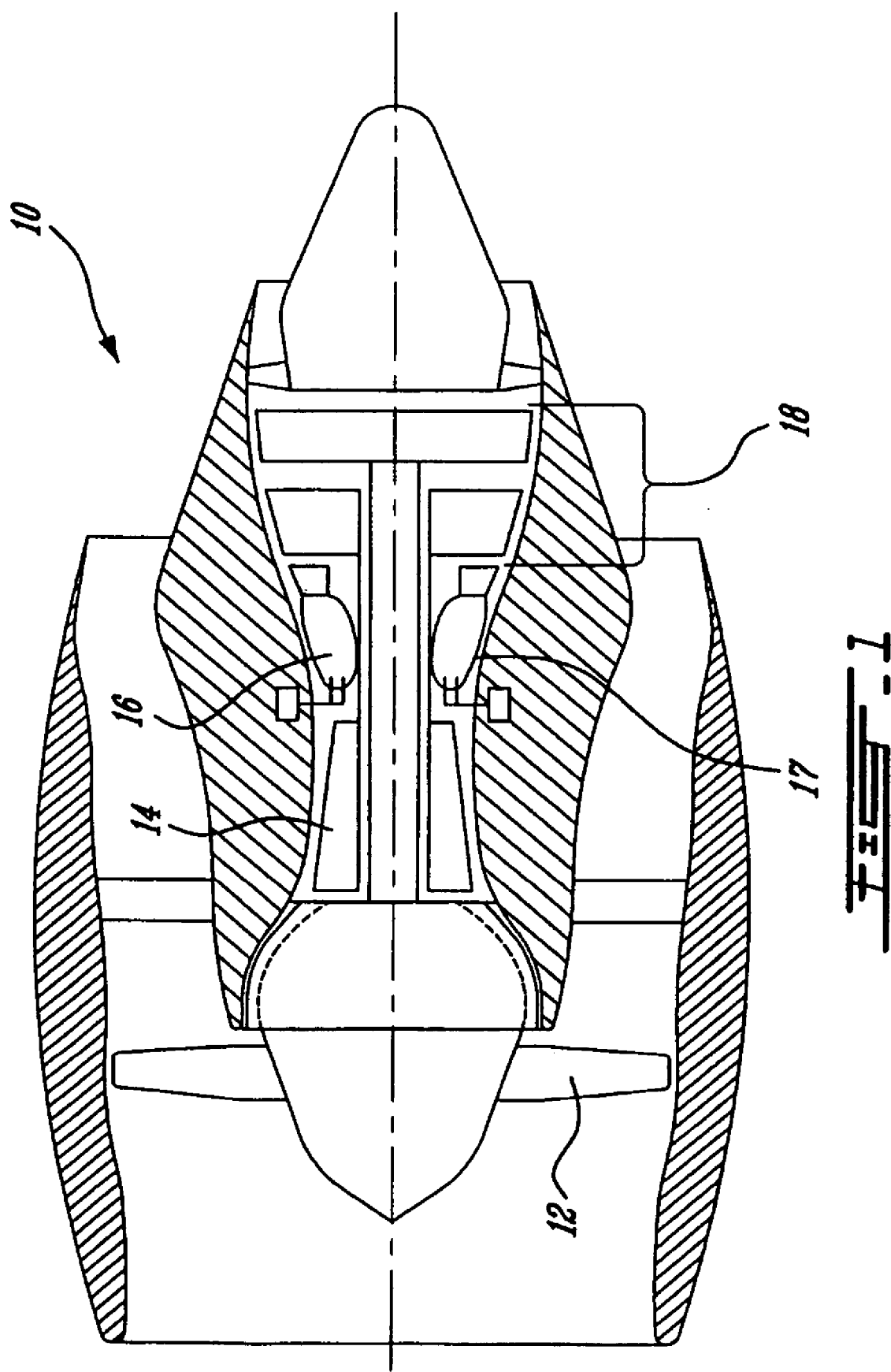
FIG. 1 is a schematic cross-sectional side view of a gas turbine engine in which the present invention can be used.

FIG. 1 illustrates a gas turbine engine 10 of a type preferably provided for use in subsonic flight, generally comprising in serial flow communication a fan 12 through which ambient air is propelled, a multistage compressor 14 for pressurizing the air, a combustor 16 in which the compressed air is mixed with fuel and ignited for generating an annular stream of hot combustion gases, and a turbine section 18 for extracting energy from the combustion gases.

Referring to FIGS. 2 and 3, the combustor 16 (see FIG. 1) comprises a fuel supply assembly 20 which comprises a manifold 24 (only a portion of which is shown), a fuel nozzle 22 (only part of which is shown) in fluid communication engagement with each of the manifold portions 24, and a connecting member 26 retaining each fuel nozzle 22 in engagement with the respective manifold portion 24.

Each fuel nozzle 22 comprises a nozzle head 28 located outside of the casing 17 (see FIG. 1) of the combustor 16, a nozzle tip (not shown) located within the combustor casing 17 and delivering fuel thereto, and a nozzle stem 30 connecting the head 28 to the tip and providing fuel communication therebetween. Preferably, the nozzle head 28 has a generally spherical shape with two cut sections forming first and second substantially perpendicular flat surfaces 32,38. The spherical shape has a center 29 located on a longitudinal axis 31 of the stem 30, allowing the stem 30 and head 28 to be turned at the same time, thus reducing machining costs and time. Alternately, it is also considered possible to provide a cylindrically shaped head, or a head of any other adequate shape.

A fuel entry port 34 is included in the first flat surface 32 and defines one end of an entry conduit 35 which extends within the nozzle head 28. The entry conduit 35 is preferably substantially parallel to the second flat surface 38. The entry conduit 35 is in fluid communication with a fuel flow path 36 which extends within the nozzle stem 30 to deliver fuel to the nozzle tip.

A finger portion 40 extends substantially perpendicularly from the second flat surface 38 and has a rectangular cross-section. The finger portion 40 includes a hole 42 defined therethrough, preferably parallel to the second flat surface 38, for receiving therein a corresponding pin 44 as will be described in further detail below.

As seen in FIG. 3, the manifold portion 24 includes a main conduit 50 which is adapted to be in fluid communication with the main conduit of similar adjacent manifold portions (not shown). The manifold portion 24 also includes a transfer conduit 48 extending from the main conduit 50 in fluid communication therewith, preferably perpendicularly. The main conduit 50 and transfer conduit 48 preferably form a single piece of integral construction. The outer wall surface 46 of the transfer conduit 48 includes first, second and third grooves 52,54,56 defined therein.

The transfer conduit 48 is sized such as to be snugly received in mating engagement within the entry conduit 35 of the nozzle head 28, with the third groove or depressed portion 56 remaining outside thereof. A sealing element such as at least a first o-ring 58 is located within the first groove 52 and abuts the inner wall 37 of the entry conduit 35. Preferably, a second o-ring 60 is also located within the second groove 54 and abuts the inner wall 37 of the entry conduit 35. Thus, a sealed fluid communication is provided between the manifold main conduit 50 and the nozzle fuel flow path 36, through the intermediate connected entry conduit 35 and transfer conduit 48 engaged in a tight-fit relationship. The engaged entry conduit 35 and transfer conduit 48 are preferably substantially parallel to a central longitudinal axis 11 of the engine 10 (see FIG. 1) to allow the connection to be made without the need to twist or bend the manifold.

The fuel nozzle 22 and the manifold 24, and therefore the entry conduit 35 and transfer conduit 48, are maintained in engagement by the connecting member or sleeve 26. The sleeve 26 has a cylindrical tubular shape defined by a wall 62. A slot 64 is defined within the wall 62, extending from a first open end 63 of the sleeve 26. Two diametrically opposed transverse holes 70 are defined through the wall 62 near the second open end 69 of the sleeve 26. The sleeve 26 is slidingly engaged around the nozzle head 28 with the sleeve holes 70 aligned with the finger portion hole 42 and with the transfer conduit 48 being received within the slot 64. A wall portion 66 of the sleeve wall 62 bordering the slot 64 is engaged within the third groove 56 defined in the outer surface of the manifold transfer conduit 48, thus preventing the transfer conduit 48 from sliding out of the entry conduit 35 of the fuel nozzle head 28. The sleeve 26 is retained around the nozzle head 28 by a pin 44 inserted through the aligned holes 42,70. The pin 44 can be, for example, a cotter pin or other similar retaining means such as a lock wire.

In use, the transfer conduit 48 of the manifold portion 24, with the o-rings 58,60 in place in the first and second grooves 52,54, is slidingly engaged into the entry conduit 35 of the nozzle head 28. The connecting member or sleeve 26 is slidingly engaged around the nozzle head 28 and the wall portion 66 bordering the slot 64 is received within the third groove or depressed portion 56 of the transfer conduit 48. The pin 44 is inserted into the aligned sleeve holes 70 and finger portion hole 42 of the nozzle head 28 to retain the sleeve 26 in place.

The fuel supply assembly 20 presents several advantages, one of which being that the assembly of the manifold portion 24 with the corresponding fuel nozzle 22 can be done by hand, without the need for special tools. Thus, considerable assembly and disassembly time savings are made possible. Also, the spherical head 28 can be easily adapted for a variety of different orientations for the connection with the manifold. The very compact arrangement between the nozzle 22 and manifold portion 24 produces increased stiffness of the system which improves vibration performances. The connecting member or sleeve 26 is easy to manufacture and provides a connection at very low cost and weight. The prefabricated, single piece manifold portion 24 provides a limited number of parts in the assembly 20 with a reduced risk of leakage. The nozzle head 28 is shaped such that it can be turned simultaneously with the nozzle stem 30, which also provides for a limited number of parts with a reduced risk of leakage, as well as ease of manufacturing.

The above description is meant to be exemplary only, and one skilled in the art will recognize that changes may be made to the embodiments described without department from the scope of the invention disclosed. For example, the entry conduit 35 can protrude from the nozzle head 28 and be received within the transfer conduit 48 of the manifold portion 24. The groove or depressed portion 56 can be have a variety of adequate cross-sections as well as be provided in a different location on the outer surface of the manifold portion 24. It is also considered to have the wall portion 66 of the sleeve 26 engaged within a groove defined in the nozzle head 28, and retained by a pin 44 or similar means to the manifold portion 24. The connecting member 26 can be of any other appropriate shape, including a shape surrounding only partially or not surrounding at all the nozzle head 28 or manifold portion 24, as long as it is adapted to retain the entry conduit 35 and transfer conduit 48 in engagement with one another. The fuel supply assembly 20 can be used in other types of engines, including turboprop engines and industrial gas turbine engines. Still other modifications which fall within the scope of the present invention will be apparent to those skilled in the art, in light of a review of this disclosure, and such modifications are intended to fall within the appended claims.

The invention claimed is:

1. A fuel supply assembly for a gas turbine engine, the assembly comprising:
   a manifold portion including a main conduit and a transfer conduit extending therefrom in fluid communication therewith;
   a fuel nozzle including a nozzle head having an entry conduit defined therein in fluid communication with a fuel flow path of the fuel nozzle, the transfer conduit and the entry conduit being matingly engaged to provide fluid communication between the fuel flow path of the fuel nozzle and the main conduit of the manifold portion; and means for retaining the transfer conduit and the entry conduit in mated engagement, the means including a first portion slidingly engaged in a groove defined in an outer surface of a first one of the manifold portion and the fuel nozzle and a second portion rigidly connected to the first portion, the second portion being detachably connected to the second one of the manifold portion and the fuel nozzle and preventing disengagement of the first portion from the groove, the means being disconnectable from the second one of the manifold portion and the fuel nozzle to allow disengagement of the first portion from the groove such as to permit the transfer conduit and the entry conduit, and therefore the manifold portion and the fuel nozzle, to be disengaged from one another.

2. The assembly as defined in claim 1, wherein the transfer conduit is engaged within the entry conduit in a tight-fit relationship.

3. The assembly as defined in claim 1, wherein the first one of the manifold portion and the fuel nozzle is the manifold portion, and the first portion is slidingly engaged in a groove defined in an outer surface of the transfer conduit.

4. The assembly as defined in claim 1, wherein the means include a sleeve having a wall at least partially surrounding the second one of the manifold portion and the fuel nozzle, and the first portion is part of the wall of the sleeve.

5. The assembly as defined in claim 4, wherein the second portion is another part of the wall of the sleeve and includes a pair of diametrically opposed transverse first holes defined therethrough, the second one of the manifold portion and the fuel nozzle including a finger portion protruding therefrom and having a second hole defined therein in alignment with the first holes, and the second portion is detachably connected to the second one of the manifold portion and the fuel nozzle through a pin slidingly engaged in the first and second holes.

6. The assembly as defined in claim 4, wherein the second one of the manifold portion and the fuel nozzle is the fuel nozzle, and the sleeve wall forms a cylindrical perimeter substantially surrounding the nozzle head.

7. The assembly as defined in claim 6, wherein the nozzle head has an at least partially spherical shape.

8. The assembly as defined in claim 4, wherein an elongated slot is defined in the sleeve wall and extending from a wall end, and the part of the wall of the sleeve borders the slot.

9. The assembly as defined in claim 1, wherein the transfer and entry conduits are substantially parallel to a central longitudinal axis of the gas turbine engine.

10. A fuel supply assembly for a gas turbine engine, the assembly comprising:

a fuel manifold having a main conduit and a plurality of transfer conduits extending from the main conduit in fluid communication therewith, an outer wall surface of each of the transfer conduits including a depressed wall portion of reduced cross-section;

a fuel nozzle for each of the transfer conduits, the fuel nozzle having a stem with a fuel flow path defined therein and a nozzle head connected to the stem, the nozzle head having an entry conduit defined therein in fluid communication with the fuel flow path, the entry conduit and a respective one of the transfer conduits being matingly engaged to provide fluid communication between the main conduit of the manifold and the fuel flow path; and a connecting member including at least one wall portion defining a wall end, the connecting member being detachably connected to the nozzle head of the fuel nozzle with the wall end engaged within the depressed wall portion of the respective one of the transfer conduits such as to prevent the entry conduit and the respective one of the transfer conduits to be slidingly disengaged from each other, the connecting member being disconnectable from the nozzle head and disengageble from the depressed wall portion to allow the entry conduit and the respective one of the transfer conduits, and therefore the fuel nozzle and the fuel manifold, to be disengaged from each other.

11. The assembly as defined in claim 10, wherein the respective one of the transfer conduits is engaged within the entry conduit.

12. The assembly as defined in claim 10, wherein the connecting member includes a sleeve with a wall including the wall portion and surrounding at least partially the nozzle head.

13. The assembly as defined in claim 12, wherein the wall of the sleeve includes a pair of diametrically opposed transverse first holes defined therein, the nozzle head including a finger portion protruding therefrom and having a second hole defined therein in alignment with the first holes, and the connecting member is detachably connected to the nozzle head by a pin slidingly engaged through both the first and second holes.

14. The assembly as defined in claim 12, wherein an elongated slot is defined in the sleeve wall with a border of the slot including the wall end engaged within the depressed wall portion of the respective one of the transfer conduits.

15. The assembly as defined in claim 12, wherein the nozzle head has an at least partially spherical shape.

16. The assembly as defined in claim 10, wherein the transfer and entry conduits are substantially parallel to a central longitudinal axis of the gas turbine engine.

17. A method for connecting a fuel nozzle to a fuel manifold in a gas turbine engine, the method comprising the steps of:

matingly engaging a transfer conduit of the manifold and an entry conduit of a nozzle head of the fuel nozzle to form a sealed connection;

providing a connecting member and engaging a wall portion of the connecting member within a groove defined in an outer surface of a first one of the manifold and the fuel nozzle to prevent disengagement of the transfer conduits of the fuel manifold and the entry conduit of the fuel nozzle from each other; and detachably connecting the connecting member to a second one of the manifold and the fuel nozzle to prevent disengagement of the wall portion from the groove, the connecting member being disconnectable from the second one of the manifold and the fuel nozzle and disengageable from the groove to allow the entry conduit and the transfer conduit, and therefore the fuel nozzle and the fuel manifold, to be disengaged from each other.

18. The method as defined in claim 17, wherein the step of engaging the wall portion of the connecting member within the groove is done concurrently with a step of surrounding a portion of the second one of the manifold and the fuel nozzle with a wall of the connecting member, the wall including the wall portion.

19. The method as defined in claim 17, wherein the step of engaging the wall portion of the connecting member within the groove is done by engaging a portion of the outer surface including the groove within a slot defined in a wall of the connecting member, the wall portion including a border portion of the slot.

20. The method as defined in claim 17, wherein the step of detachably connecting the connecting member to the second one of the manifold and the fuel nozzle includes inserting a pin in aligned holes defined within a wall of the connecting member and within a finger portion protruding from the second one of the manifold and the fuel nozzle.

* * * * *